July 13, 1954  M. KOSMAN  2,683,480
FOLDABLE CHILD'S VEHICLE
Filed April 15, 1949  2 Sheets-Sheet 2
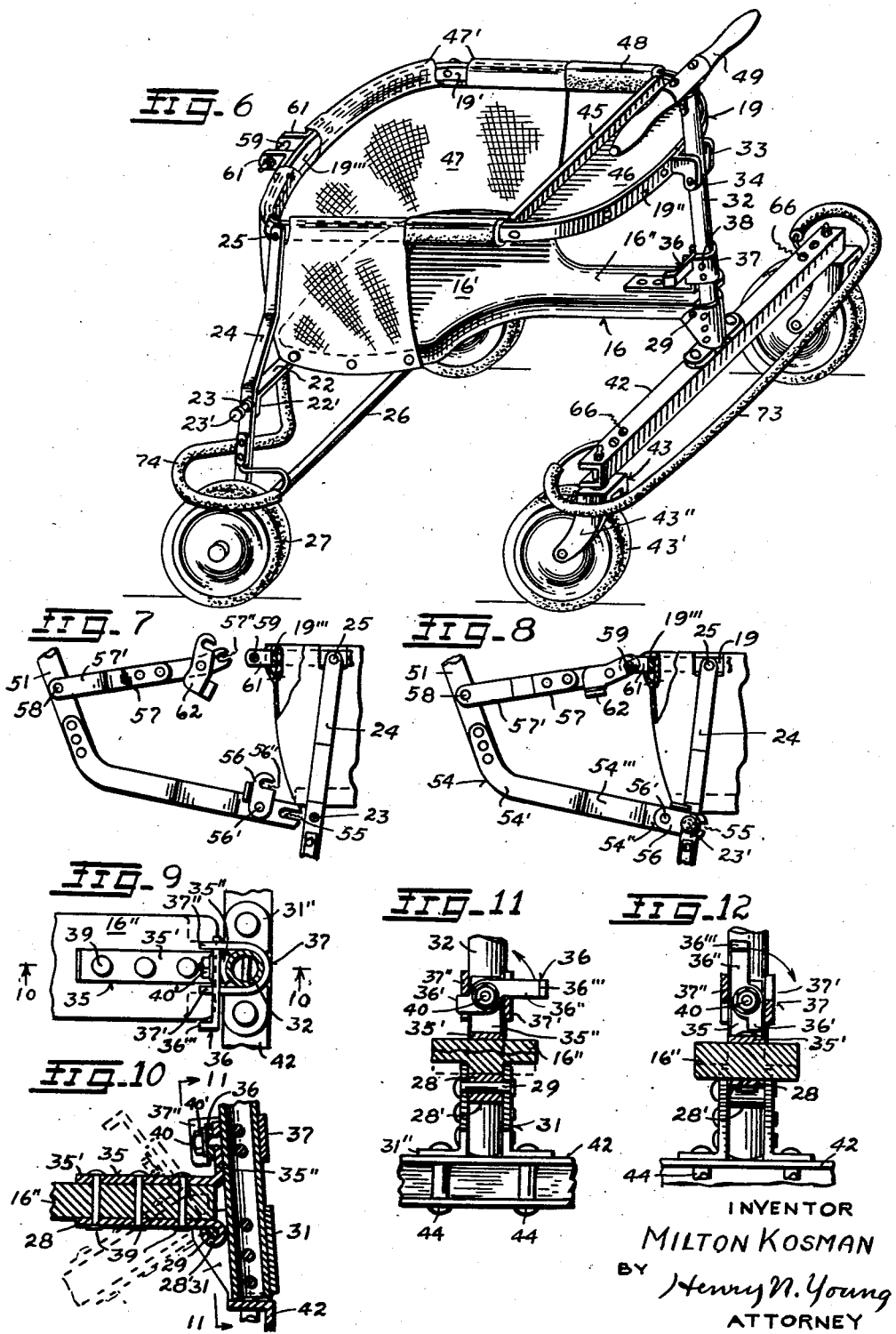
INVENTOR
MILTON KOSMAN
BY Henry N. Young
ATTORNEY Patented July 13, 1954

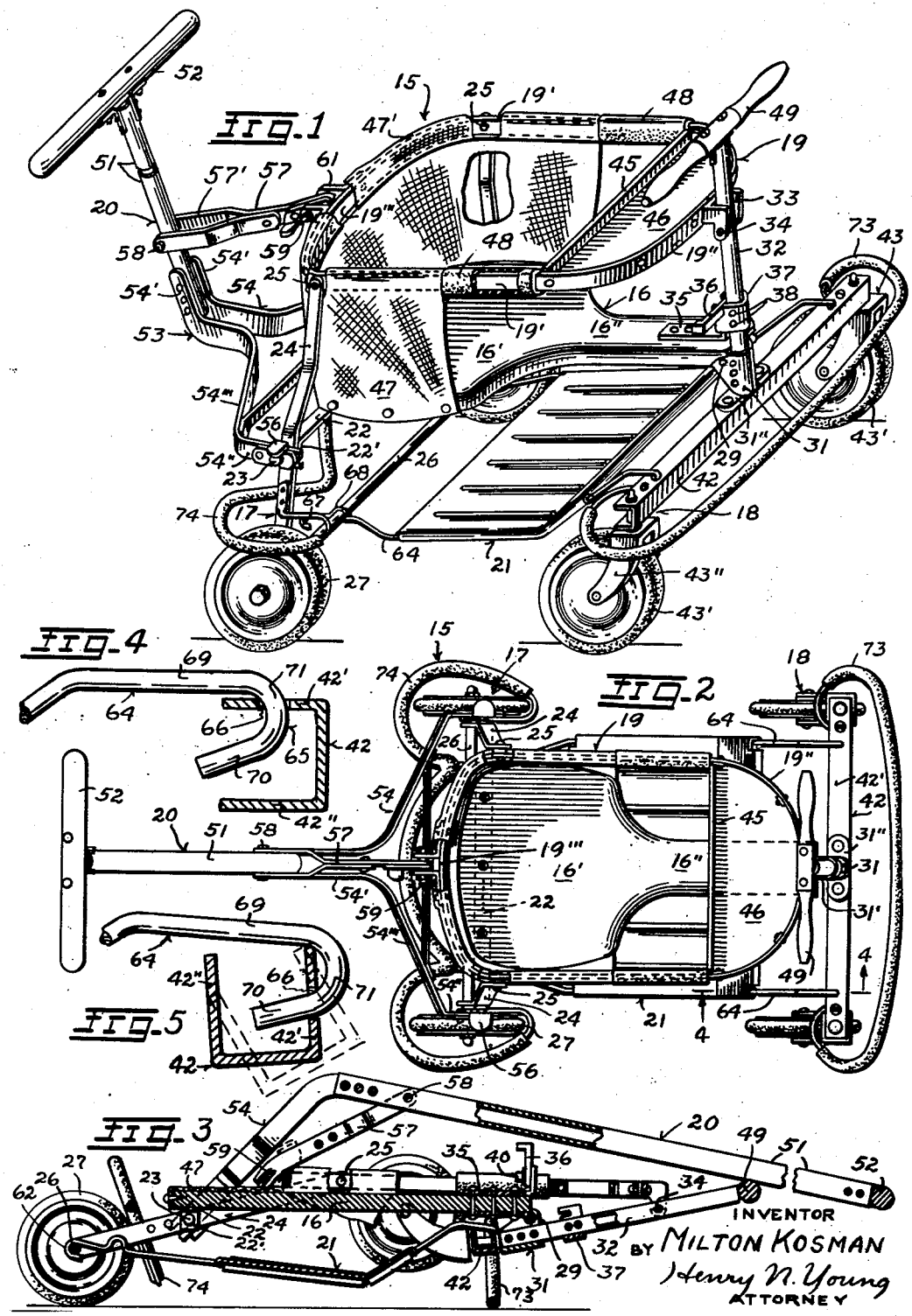

2,683,480

UNITED STATES PATENT OFFICE 2,683,480

FOLDABLE CHILD'S VEHICLE

Milton Kosman, Oakland, Calif.

Application April 15, 1949, Serial No. 87,741

5 Claims. (Cl. 155—22)

The invention relates to a foldable child's vehicle of the push-cart type.

A general object of the invention is to provide a child's vehicle of the character described which is readily foldable in a particularly compact manner and comprises a unitary structure of relatively few elements.

Another object is to provide a particularly simple and effective means for releasably locking the vehicle frame in use condition.

A further object is to provide a vehicle of the character described which is readily convertible into a walker by replaceably removing handle and foot-rest elements thereof in a particularly simple manner.

The invention possesses other objects and features of advantage, some of which, with the foregoing, will be set forth or be apparent in the following description thereof, and in the accompanying drawings, in which, Figure 1 is a perspective showing of the present vehicle set up as a push-cart or stroller.

Figure 2 is a plan view of the vehicle.

Figure 3 is a longitudinal sectional view of the folded vehicle.

Figures 4 and 5 are enlarged fragmentary sections taken at the plane of the line 4—4 in Figure 2, the views showing the relations of the parts shown when the vehicle is unfolded and folded respectively.

Figure 6 is a perspective view of the vehicle set up as a walker.

Figures 7 and 8 are enlarged fragmentary elevations at the connections of a handle of the vehicle to its chassis, connecting parts being shown in disconnected and connected relation in the respective views.

Figure 9 is an enlarged plan view taken at the front connection for the seat-board of the vehicle.

Figure 10 is a section taken at the line 10—10 in Figure 9.

Figures 11 and 12 are sectional elevations taken at the line 11—11 in Figure 10, the views showing a locking means of the assembly as operative and inoperative respectively.

The features of my invention are particularly shown as applied in the structure of a unitary stroller or push cart 15 for use in the transportation of children. The stroller unit 15 essentially comprises a seat-board 16 arranged for its straddled occupancy, a wheeled rear running gear 17 hingedly fixed to the rear end of the seat-board, a castered front running gear 18 hingedly fixed to the forward end of the seat-board, a handle assembly 20 detachably mounted at the rear of the vehicle, and a foot-rest plate 21 detachably carried by and between the running gears 17 and 18. The body-receiving loop 19 connects upwardly extending elements of the running gears 17 and 18 in such a manner that the frame assembly of the vehicle is foldable as a quadrilateral.

As is customary in the present type of vehicle the seat-board 16 has a wide rear seat portion 16' and is symmetrically narrowed forwardly therefrom to a portion 16" where the occupant straddles the board. The present seat-board 16 has a relatively stiff support member 22 fixed to and beneath its rear end transversely of its longitudinal axis. Terminal portions 22' of the member 22 are turned down and are transversely perforated for receiving mutually aligned pivot pins 23 which secure corresponding upright members 24 of the rear running gear 17 to the portions. The members 24 extend correspondingly upwardly of the pins 23 to hinged connections at pins 25 with side points of the body-receiving loop 19 for supporting the loop thereat, and the lower ends of the members 24 receive therethrough an axle 26 having suitable support wheels 27 mounted on its extending ends.

At and beneath the forward end of the front seat-board portion 16", the said board mounts a hinge leaf 28 providing an eye 28' for receiving a hinge pin 29 which also engages ears 31' of a U-shaped member 31 which embraces and is riveted to a non-rotatable post member 32 comprising a top element of the front running gear 18. Mutually spaced ears 33 extend from the center front point of the body-receiving loop 19 to receive the post 32 between them, and are attached to the post by means of a hinge pin 34 extending through them and the post.

It will now be particularly noted that the axes of hinging provided by the hinge pins 23 and 25 and 29 and 34 intersect a plane longitudinally of and perpendicular to the seat-board 16 to provide the vertices or points of a quadrilateral such that the assembly may be folded or collapsed from its use condition by a movement of the body-receiving loop 19 forwardly over and toward the seat-board, said movement being accompanied by a disposal of the rear wheels 27 generally rearwardly of the seat-board, and the disposition of the top part of the post 32 forwardly of the seat-board.

Means are provided for releasably securing the frame of a vehicle in its unfolded condition for use, and said means is directly cooperative between the seat-board 16 and the post 32 of the front running gear. As is brought out in detail in Figures 9 to 12 inclusive, the fastening means provided essentially comprises a member 35 mounted at the forward extremity of the seat-board and carrying a swingable locking bar 36 for operatively engaging notches provided by a keeper member 37 mounted on the post; more specifically, the member 37 is U-shaped and closely receives the post 32 to which it is fixed as by rivets 38. The sides of the member 37 extend rearwardly of the post in spaced parallel relation to a central longitudinal upright plane through the seat board and post, and one ear 37' thus provided is notched from above while the other ear 37'' is notched from below, the notches being mutually coplanar for cooperation with the locking bar 36.

It will now be noted that the member 35 is L-shaped and has one arm 35' bolted or riveted to the top of the seat-board 16 by the same bolts or rivets 39 which secure the hinge leaf 28 to the board, while the other arm 35'' of the member extends upwardly for disposal along the post and between the ears 37' and 37'' when the vehicle is fully unfolded. The arm 35'' mounts the locking bar 36 for swinging about a pivot 40, which in the present instance comprises a stud bolt extending from the upright 35'' for a removable mounting of the locking bar 36 thereon between a nut 40' and the arm 35''. The locking bar 36 essentially comprises mutually coplanar and laterally offset arm portions 36' and 36'' for simultaneous engagement in the notches of the ears 37' and 37'' of the member 37 (Figs. 9 and 11) or between said arms in freed position (Fig. 12). For facilitating manual shiftings of the locking bar 36, the arm 36'' may be longer than necessary for locking purposes and be provided with a transversely outturned portion 36''' for use as a manipulating knob.

The post 32 extends fixedly from the middle of a bolster bar 42 having caster wheel assemblies 43 mounted beneath its extremities and providing wheels 43' for engaging a supporting surface. In the present structure, the bar 42 is straight and is of channel section having its open side directed rearwardly, and the post 32 is secured to it by means of rivets 44 engaging through the bar flanges and ears 31'' extending laterally from the member 31 which provides the hinge ears at the hinged connection of the post and seat. It will be noted that the caster wheels 43' are carried by forks 43'' having their stems journalled and retained as freely-rotatable spindles in and between the flanges of the bar 42, whereby these wheels are free to independently change their directions of rolling with respect to the seat-board.

The body-receiving member 19, it will now be noted, comprises a closed loop formed of a strip of suitable material and having parallel side portions 19' connected by front and rear portions 19'' and 19''' respectively. The pivot pins 25 secure the upright members 24 of the rear running gear to the member 19 at the rear ends of its sides 19', and the ears 33, which are utilized in hinging the member 19 to the post 32, are provided at the center point of the front portion 19'' of the member. A cross-member 45 connects forward ends of the loop sides 19', and this member and the forward loop portion 19'' cooperatively mount a plate 46 at their bottom plane whereby to provide a tray at the vehicle front while the plate 46 stiffens the loop against distortion in its plane.

A suitable fabric member 47 encloses the space between the seat portion 16' of the board 16 and the rear part of the loop 19 for laterally bounding the seat space; in the present structure, the member 47 is provided at its top with a hem 47' receiving the loop 19 thereat, while the bottom of said member is tacked to and around the seat portion 16' of the board. A tubular guard sheath 48 of rubber or the like is mounted on the loop band between the forward end of the member 47 and the tray. Preferably, and as shown, the post 32 extends above the loop 19 and is provided with handles 49 extending oppositely from the post in a line parallel to the bolster bar 42; the handles 49 and the sheaths 48 are understood to provide hold-on grips for use by an occupant of the vehicle.

It will now be noted that the handle assembly 20 comprises a draft-tongue member 51 provided across its free end with a grip bar 52 and having a fork connection 53 with the members 24 of the rear running gear assembly. The present tongue 51 is of circular cross-section, and the fork connection 53 comprises complementarily formed side members 54 shaped of strip material and having end portions 54' riveted to the inner tongue end. The fork sides 54 have their terminal portions 54'' parallel to the portions 54' and transversely offset therefrom by connecting portions 54''' which are oblique to the end portions and are connected by a spreader bar adjacent their juncture with the portions 54''.

As particularly shown in Figures 6 and 7 and 8, the pivot pins 23 which connect the members 24 with the seat element 22 have headed extensions 23' directed outwardly of the members 24, and the shanks of said extensions are arranged for releasably retained engagement in slots 55 extending into the fork-side portions 54'' from their free ends for securing the handle to the vehicle body. Hook members 56 releasably secure the pivot pin extensions 23' in the slots 55, said members comprising plate elements pivoted to the portions 54'' at pins 56', and provided with notches 56'' for engaging the shanks of the pin extensions 23' in the slots 55 for releasably and hingedly securing the handle fork assembly to the rear running gear.

Noting that the now-described connection of the tongue 51 to the vehicle would permit a free swinging of the tongue, it is usually preferable that the tongue be held in a most convenient angular use relation to the vehicle in which it slopes upwardly and rearwardly from the vehicle. Accordingly, means are provided for releasably connecting the tongue 51 with the rear center point of the loop 19, said means essentially functioning as a link. As particularly shown, a link 57 is provided for connecting the tongue 51 with the loop 19, said link having a forked end portion 57' spanning and fixed to the tongue by a hinge pin 58 extending through the tongue at the extremity of the fork. As particularly brought out in Figures 6 to 8, the other link end is provided with a longitudinal slot 57'' extending from its extremity for receiving the shank of a hinge bolt 59 carried by and between ears 61 extending rearwardly from the rear loop portion 19'''. A hook member 62 pivoted to the link 57 adjacent its slot 57'' is operative as the hook 56, for releasably retaining the hinge bolt 59 in the slot. It will thus be understood that the handle 20 is detachably attached to the vehicle for its removal when the vehicle is to be used as a walker.

Noting that the axes of hinging defined by the pins 23 and the pin 58 and the pin 59 and the pins 25 of the handle-mounting arrangement define a distortable quadrilateral in the central upright plane of the vehicle, the arrangement is essentially such that when the vehicle is collapsed, as is shown in Figure 3, the handle assembly may overlie and extend forwardly of the seat-board and outwardly of the loop 19 to provide a relatively thin folded assembly as is desirable for facilitating a carrying or a non-use disposal of the folded vehicle.

By particular reference to Figures 1 and 3, it will be noted that when the present stroller is set up for use, the hinging axes of the pin 58 and the pin 59 and the pins 25 are substantially coplanar, with the axes of the pin 59 slightly above the plane of the axes of the pin 58 and the pins 25. When, however, the vehicle is folded, the axes of hinging defined by the pins 23 and the pin 58 and the pin 59 are substantially coplanar whereby the link 57 and the rear loop portion 19''' define an acute angle within the acute angle defined by the planes of the handle fork sides 54 and the side members 24 of the rear running gear 17. The foldable attachment for the handle 20 thus provided permits a particularly compact collapsed folding of the present stroller structure, it being further noted that the grips 49 of the post 32 of the front running gear are disposable against the tongue 51 of the handle 20 for use in suspendingly carrying the folded vehicle by a hand.

Referring now to the footrest plate 21, it will be noted that the same is mounted on like rod members 64 fixed to its side edges and extending forwardly and rearwardly therefrom. The forward ends of the rods 64 are formed to provide terminal down-turned return-bends 65 for insertion as hooks in appropriately spaced and positioned holes 66 provided in the upper flanges 42' of the bolster bar 42. The rearward extremities of the rods 64 are provided with down-turned return-bends 67 which may receive the axle 26 as hooks when the vehicle is folded (Fig. 3), and the rods 64 are provided with upwardly directed return-bend offsets 68 forwardly of the hooks 67 for receiving the axle 26 from below when the vehicle is unfolded (Fig. 1). Having the footrest 21 installed on the vehicle, with the forward hooks 65 engaged in the holes 66, and the rear rod portions resting upon the axle 26, the engagement of the axle in the rod offsets 64 is arranged to stiffen the vehicle structure, and the rear hooks 67 are arranged to receive the axle when the vehicle structure is fully folded (Fig. 3) for then cooperating with the engaged front hooks 65 for retaining the footrest in the assembly.

It will now be particularly noted that the forward hooks 65 of the footrest 21 are so shaped in relation to the receiving holes 66 of the bolster bar 42 that they may not be removed from said holes while the vehicle is either fully folded (Figures 3 and 5) or unfolded (Figures 1 and 4), it being understood that the rods 64 of the mounted footrest assembly are constantly disposed between the axle and seat-board; in this manner, the footrest may not be detached while the vehicle is either set up or fully folded.

As is particularly brought out in Figures 4 and 5, each forward footrest hook 65 is defined by straight portions 69 and 70 of the rod 64 connected by an arcuate bend portion 71, with the portion 70 comprising the terminal part of the rod and defining an acute angle of about twenty-five degrees with the portion 69. Also, the bend portion 71 of the hook is so formed that the flange 42' of the bar 42 is freely slidable along the hook engaged in its hole 66 as the bar 42 is rotatively turned with respect to the footrest between its limiting position shown for it in Figures 4 and 5 while the hook portion 70 is freely swingable in the bar space; an intermediate disposal of the bar 42 for facilitating an engagement or disengagement of the footrest hooks 65 with the bar is indicated in dash lines in Figure 5.

Noting that portions 69 of the attaching and support rods 64 of the footrest unit rearwardly of their offsets 68 normally rest upon the axle 26 as the vehicle is folded or unfolded, a removal of the footrest unit for converting the vehicle into a walker may be effected by swinging the rear end of the unit toward the seat to dispose the rear hooks 67 above the axle after folding of the vehicle is started, further folding the vehicle to dispose the bolster bar for the disengagement of the hooks 65 thereof, pushing the footrest forwardly to release the hooks 65 from the bar, and then removing the footrest rearwardly from beneath the seat-board while holding the hooks 65 clear of the bar 42; the installation of the footrest is, of course, effected by reversing the procedure and order of the aforesaid steps. It will thus be understood that an accidental or deliberate removal of the footrest is positively prevented when the vehicle is fully folded or fully unfolded, yet is freely permitted when the vehicle is partly folded.

As particularly shown, the bolster bar 42 mounts a suitably shaped bumper member 73 extending forwardly thereof, and the rear running-gear members 24 mount a suitably shaped bumper 74 extending generally rearwardly therefrom. While in the illustrated structure the seat-board 16 is of wood, the wheels 27 and 43' have solid rubber tires, the front hand grips 49 on the post 32 and the hand grips 52 of the tongue 51 are of wood, and the remaining chassis members are of metal, it will be understood that I do not limit myself to the use of said particular materials in the different elements of the present vehicle structure.

From the foregoing description taken in connection with the accompanying drawings, the advantages of the present foldable child's vehicle will be readily understood by those skilled in the art to which the invention appertains. While I have described the principle of operation, together with a form of my invention which I now consider to comprise a preferred embodiment thereof, I desire to have it understood that the showing is primarily illustrative, and that such changes and developments may be made, when desired, as fall within the scope of the following claims.

I claim:

1. In a foldable vehicle of the character described, a flat seat-board, wheeled supports hinged to said board for swinging about mutually parallel axes at forward and rear points with respect to the board, and a closed body-receiving planar loop member of fixed form disposed above said board and lacking projections extending toward said handle board and hingedly fixed at forward and rear points thereof in its plane to said supports, the four axes of hinging of the aforesaid parts being mutually parallel and constantly defining the vertices of a quadrilateral having sides of fixed length in a plane longitudinal of the vehicle and perpendicular to said axes to provide for a folded disposal of the body-receiving loop in flat contacting engagement with the seat-board.

2. In a foldable vehicle of the character described, a seat-board for straddled use, a support for the rear of the board comprising corresponding support members hingedly related to said board at opposite sides thereof for swinging about a common axis which is perpendicular to the longitudinal axis of the board, an axle member extending between said support members in parallel relation to their hinging axis, mutually spaced wheels rotatably mounted on said axle member, a support for the front of the board comprising a post member hinged thereto and extending rigidly from a crossbar beneath its lower end, a member hingedly connecting said supports for constraining them to a folding swinging toward the board, a footrest member directly connected to and supported by and between the rear axle and the crossbar, and forward and rear hooks on the footrest respectively providing direct hooked connections between the footrest and the crossbar and between the footrest and the axle such that the footrest may be disconnected from the crossbar only while the vehicle is in a partly folded condition.

3. A structure in accordance with claim 2 having the crossbar of channel form with its cavity facing toward the wheel axle, and a flange thereof provided with openings therethrough receiving the forward hooks of the footrest forwardly extending hooks which are insertable in or removable from the flange openings.

4. In a foldable vehicle of the character described, a flat seat-board, a support for the rear of the board comprising corresponding support members hinged to said board at opposite sides thereof for swinging about a common axis which is parallel to the board and perpendicular to the longitudinal axis of the board, an axle member extending between said support members adjacent their bottoms and in parallel relation to their hinging axis, mutually spaced wheels rotatably mounted on said axle member, a wheeled support for the front of the board hingedly attached thereto, and a planar body-receiving closed loop member of fixed form lacking projections at the seat side thereof and hingedly connecting said supports above the seat board at points in its plane, the four axes of mutual hinging of the board and supports and last member being mutually parallel and defining the apices of a quadri-lateral in a central plane longitudinal of the vehicle and perpendicular to said axes, and providing for a forward folding of the body-receiving member against the seat-board in flat contacting relation therewith.

5. In a foldable vehicle of the character described, a flat seat-board, a support for the rear of the board comprising corresponding support members hingedly related to said board at opposite sides thereof for swinging about a common axis which is at right angles to the longitudinal axis of the seat-board, an axle member extending between said support members adjacent their bottoms and in parallel relation to their hinging axis, mutually spaced wheels rotatably mounted on said axle member, a wheeled support for the front of the board hinged thereto, a planar body-receiving member opposite and above the seat-board hingedly connecting said rear supports with said front support at coplanar points in the plane of the member for a forward folding of the body-receiving member flat against the seat-board, and a handle member having its bottom end hingedly fixed to the rear support members and having a link hingedly connecting it to said body-receiving member at a rear point thereof to provide for a forward folding of the handle and back-receiving members together simultaneously with the forward folding of the body-receiving member to dispose the folded handle against the body-receiving member when the vehicle is fully folded.

References Cited in the file of this patent

UNITED STATES PATENTS

| Number | Name | Date |
| --- | --- | --- |
| 1,087,928 | Diemer | Feb. 24, 1914 |
| 1,622,108 | Hawkinson | Mar. 22, 1927 |
| 1,745,569 | Eberle | Feb. 4, 1930 |
| 1,793,848 | Gill et al. | Feb. 24, 1931 |
| 2,314,659 | Peterson | Mar. 23, 1943 |
| 2,455,168 | Gilmore | Nov. 30, 1948 |
| 2,576,356 | Peterson | Nov. 27, 1951 |

FOREIGN PATENTS

| Number | Country | Date |
| --- | --- | --- |
| 462,647 | France | Apr. 27, 1915 |